United States Patent [19]

Matsumoto et al.

[11] Patent Number: 4,470,702
[45] Date of Patent: Sep. 11, 1984

[54] EQUIVALENT TONE REGION DETECTING DEVICE

[75] Inventors: Tamotsu Matsumoto, Yokohama; Yoshifumi Umehara, Hachioji, both of Japan

[73] Assignee: Nihon Regulator Co., Ltd., Tokyo, Japan

[21] Appl. No.: 317,113

[22] Filed: Nov. 2, 1981

[30] Foreign Application Priority Data

Nov. 6, 1980 [JP] Japan .................... 55-155223

[51] Int. Cl.$^3$ .................................. G01N 21/27
[52] U.S. Cl. .................................. 356/404; 356/406
[58] Field of Search ............ 356/404, 405, 406, 408, 356/425; 358/22, 80; 382/17

[56] References Cited

U.S. PATENT DOCUMENTS 4,172,264  10/1979  Taylor et al. .................. 358/22 X
4,183,045  1/1980   Herrmann et al. ............... 358/22
4,217,648  8/1980   Thurm et al. .................. 356/404 X

FOREIGN PATENT DOCUMENTS 56-84528  7/1981  Japan ........................... 356/404

Primary Examiner—Vincent P. McGraw
Assistant Examiner—L. A. Dietert
Attorney, Agent, or Firm—Robert E. Burns; Emmanuel J. Lobato; Bruce L. Adams

[57] ABSTRACT

In an equivalent tone region detecting device, a position on a color picture is specified, so that video signals are provided separately according to the tricolor hues for the specified position through a scanning operation with a television camera, and similarly video signals are provided for another position through the succeeding scanning operation. The former and latter video signals are compared with one another, respectively, to determine whether or not the tone of the second position is equivalent to that of the specified position, whereby a region which is equal in tone to the specified position is detected.

4 Claims, 1 Drawing Figure

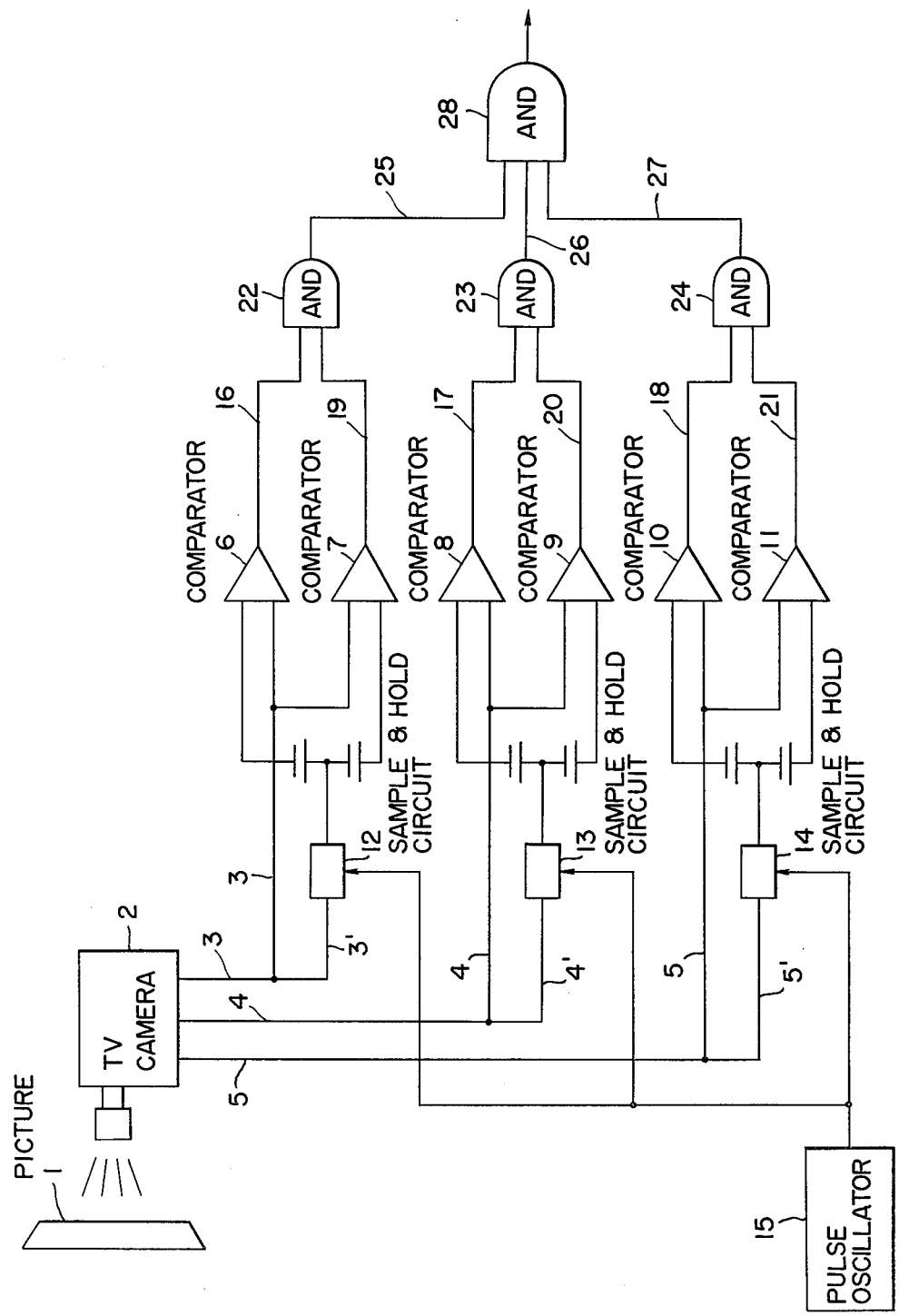

EQUIVALENT TONE REGION DETECTING DEVICE

BACKGROUND OF THE INVENTION

This invention relates to a picture analyzer, and more specifically to a device for detecting a region in a picture which is equivalent in tone to a point which is optionally specified in the picture.

A "VIP21CH" type picture analyzer manufactured by Olympus Kogaku Kogyo Kabushiki Kaisha (Olympus Optical Industry Co., Ltd.) has been proposed in the art, to detect only a region having a tone from a color picture formed with a number of tones. In such a conventional equivalent tone region detecting device, several reference tones are set in advance, and among these tones, a desired one is selected so that a region whose tone is equivalent to the selected tone is detected from the picture. However, since the reference tones are set in advance, the conventional device cannot meet a requirement for detecting a region from a picture, the tone of which is equivalent to any desired one of the tones which are included in the picture.

SUMMARY OF THE INVENTION

In view of the foregoing, an object of this invention is to provide a device which can detect a region from a picture the tone of which is equivalent to any selected one of the tones which are included in the picture.

The foregoing object and other objects of the invention have been achieved by the provision of a device for detecting a region equivalent in tone to a region specified in a picture, which comprises: scanning means for scanning the picture, to provide signals separately according to hues in response to a tone of each of continuous minute areas in the picture; position specifying means for specifying a position on the picture; level memory means for storing, when the scanning means scans the specified position, the levels of the signals provided separately according to the hues for the specified position in response to the signal from the position specifying means; discriminating means for comparing the levels of signals provided separately according to the hues for a minute area in the succeeding scanning with the levels of the signals stored in the level memory means, and for outputting discrimination signals when these levels are equal, respectively; and logic product means for receiving the discrimination signals, to detect a region equivalent in tone according to the principle that when the discrimination signals are applied thereto simultaneously, the tone of the minute area in the succeeding scanning is equal to the tone of the specified position.

The nature, principle and utility of the invention will become more apparent from the following detailed description when read in conjunction with the accompanying drawing.

BRIEF DESCRIPTION OF THE DRAWING

In the accompanying drawing, the single FIGURE is a circuit diagram, partly as a block diagram, showing one example of an equivalent tone region detecting device according to this invention.

DETAILED DESCRIPTION OF THE INVENTION

In one example of an equivalent tone region detecting device, as shown in the single FIGURE, a color television camera 2 is used to scan a picture 1 to be measured. However, a device which scans the picture 1 to output video signals separately according to hues can be employed instead of the color television camera.

The color television camera 2 outputs video signals separately according to the tri-color hues: red, green and blue. The video signals thus outputted are applied to lines 3, 4 and 5, respectively. More specifically, tones at scanning points on the picture 1 scanned by the color television camera 2 are converted into video signals separately according to the hues of red, green and blue, and the video signals are applied to the lines 3, 4 and 5. The lines 3, 4 and 5 are extended to first input terminals of pairs of comparators 6 and 7, 8 and 9, and 10 and 11, respectively, so that the red, green and blue video signals are applied thereto. Branch lines 3', 4' and 5' are extended from the lines 3, 4 and 5, and are connected to sample and hold circuits 12, 13 and 14, respectively.

The sample and hold circuits 12, 13 and 14 are driven by a pulse signal from a position specifying pulse oscillator 15. Upon being driven by the pulse signal, the sample and hold circuits 12, 13 and 14 hold the levels $V_1$, $V_2$ and $V_3$ of the red, green and blue video signals applied thereto, respectively, and successively apply the signals thus held to second input terminals of the pairs of comparators 6 and 7, 8 and 9, and 10 and 11, respectively.

In the comparators 6, 8 and 10, the levels $V_1'$, $V_2'$ and $V_3'$ of red, green and blue video signals of each scanning point applied thereto through the lines 3, 4 and 5 are compared with the hold levels $V_1$, $V_2$ and $V_3$ applied thereto from the sample and hold circuits 12, 13 and 14, respectively. When $(V_1' < V_1 + \alpha)$, $(V_2' < V_2 + \alpha)$ and $(V_3' < V_3 + \alpha)$ the comparators 6, 8 and 10 provide outputs which are applied to lines 16, 17 and 18, respectively. Similarly, the comparators 7, 9 and 11 compare the levels $V_1'$, $V_2'$ and $V_3'$ with the hold levels $V_1$, $V_2$ and $V_3$, respectively, and when $(V_1' > V_1 - \alpha)$, $(V_2' > V_2 - \alpha)$ and $(V_3' > V_3 - \alpha)$, provide outputs which are applied to lines 19, 20 and 21, respectively.

The output lines 16 and 19 of the comparators 6 and 7, the output lines 17 and 20 of the comparators 8 and 9, and the output lines 18 and 20 of the comparators 10 and 11 are connected to AND circuits 22, 23 and 24, respectively. The output lines 25, 26 and 27 of the AND circuits 22, 23 and 24 are connected to an AND circuit 28.

The position specifying pulse oscillator 15 is operated in combination with a joy stick or a light pen in a conventional manner, so that the operator can specify a point on the picture 1 as desired, and when the color television camera 2 scans the point thus specified, the pulse signal is applied to the sample and hold circuits 12, 13 and 14.

The operation of the equivalent tone region detecting device thus organized will be described.

As was described above, when the scanning line passes through a given point specified on the picture 1, the pulse oscillator 15 outputs the pulse signal to drive the sample and hold circuits 12, 13 and 14. Upon being driven by the pulse signal, the sample and hold circuits 12, 13 and 14 hold the video signal levels $V_1$, $V_2$ and $V_3$ through the lines 3', 4' and 5', which are applied to the comparators 6 through 11, respectively. The video signal levels $V_1'$, $V_2'$ and $V_3'$ obtained by the succeeding scanning are applied to the comparators 6 through 11 through the lines 3, 4 and 5 and are compared with the levels $V_1$, $V_2$ and $V_3$, respectively.

For simplification in description, only the red video signal level $V_1'$ will be described. The video signals level of all the points on the picture 1 are successively compared with the hold signal level $V_1$ in the comparators 6 and 7. Only when each video signal level is close to $V_1$, i.e., when $|V_1-V_1'|<\alpha$, the comparators 6 and 7 provide the outputs which are applied to the AND circuit 22, the output of which is applied to the AND circuit 28.

Similarly as in the above-described case, the green and blue video signal levels $V_2'$ and $V_3'$ are processed. Only when the levels $V_2'$ and $V_3'$ are close to the levels $V_2$ and $V_3$, i.e., $|V_2-V_2'|>\alpha$ and $|V_3-V_3'|<\alpha$, the AND circuits 23 and 24 provide the outputs, which are applied to the AND circuit 28.

Upon reception of these signals thus processed, the AND circuit 28 provides an output. This means that levels of all the red, green and blue video signals obtained through the succeeding scanning are equal to those of the video signals of the specified position, respectively, and accordingly the tones of two points are also equivalent. Thus, according to the output of the AND circuit 28, an equivalent tone region in the picture 1 can be detected.

As is apparent from the above description, according to the invention, a region equivalent in tone to a given position in a picture to be measured can be detected. More specifically, with respect to all tones, regions equivalent in tone to a given position can be detected. Thus, the detecting device of the invention is high in measurement ability, and is also simple in arrangement.

What is claimed is:

1. A device for detecting a region equivalent in tone to a region specified in a picture to be measured, which comprises:

scanning means for scanning said picture, to provide signals separately according to hues in response to a tone of each of continuous minute areas in said picture;

position specifying means to provide signals for specifying positions on said picture;

level memory means for storing, when said scanning means scans a first minute area at a specified position, levels of said signals provided separately according to said hues for said specified position in response to a signal from said position specifying means;

discriminating means for comparing levels of signals provided separately according to said hues for a second minute area in a succeeding scanning of said scanning means with said levels of said signals stored in said level memory means, respectively, and for outputting discrimination signals when said levels thus compared are equal, respectively; and logic product means for receiving said discrimination signals, to detect a region equivalent in tone according to the principle that, when said discrimination signals are applied thereto simultaneously, the tone of said second minute area in the succeeding scanning is equal to the tone of said first minute area at said specified position.

2. A device as claimed in claim 1, in which said scanning means is a color television camera which outputs signals separately according to hues of tri-colors.

3. A device for detecting a region of a picture the tone of which is equivalent to that of another region in the same image plane which comprises:

means for scanning a picture and outputting for a selected region video signals separately according to the tri-color hues of red, green and blue, means for defining the position of the region scanned, means for separately memorizing said video signals for a first region of said picture scanned, means for comparing said memorized signals with like video signals for a second region scanned by said scanning means, and means for outputting a signal when the levels for said memorized signals of said first region are the same as the levels of said signals for the second region within prescribed limits.

4. A device for detecting a region of a picture the tone of which is equivalent to that of another region in the same image plane which comprises:

a TV camera for scanning a picture and outputting video signals separately according to the tri-color hues of red, green and blue, three sample and hold circuits for memorizing said video signals respectively for a first region scanned by said camera, a position specifying pulse oscillator connected with each of said sample and hold circuits, three comparator circuits receiving from said sample and hold circuits memorized signals for said first region scanned by said camera and comparing them with like video signals received from said camera for a second region scanned by said camera, and means connected to the outputs of all of said comparator circuits for producing a signal when the levels of said memorized signals of said first region are the same, within prescribed limits, with the levels of said signals for the second region.

* * * * *